United States Patent [19]

Chen

[11] 4,143,949

[45] Mar. 13, 1979

[54] PROCESS FOR PUTTING A HYDROPHILIC COATING ON A HYDROPHOBIC CONTACT LENS

[75] Inventor: Richard Y. Chen, Webster, N.Y.

[73] Assignee: Bausch & Lomb Incorporated, Rochester, N.Y.

[21] Appl. No.: 736,612

[22] Filed: Oct. 28, 1976

[51] Int. Cl.$^2$ .............................................. G02C 7/04
[52] U.S. Cl. .............................. 351/160 H; 427/41; 427/164
[58] Field of Search ........................... 427/164, 41, 39; 351/160 H

[56] References Cited

U.S. PATENT DOCUMENTS

| | | | |
|---|---|---|---|
| 3,068,510 | 12/1962 | Coleman | 427/39 |
| 3,389,012 | 6/1968 | Hamm | 427/41 |
| 3,700,573 | 10/1972 | Laizier et al. | 351/160 H X |
| 3,808,178 | 4/1974 | Gaylord | 351/160 X |
| 3,900,250 | 8/1975 | Ivani | 351/160 |
| 3,916,033 | 10/1975 | Merrill | 427/164 X |
| 3,943,045 | 3/1976 | Cordrey et al. | 351/160 H X |
| 3,950,315 | 4/1976 | Cleaver | 351/160 X |

FOREIGN PATENT DOCUMENTS 1362939  8/1974  United Kingdom ................... 351/160

OTHER PUBLICATIONS

Yasuda et al., "Graft Copolymerization of Vinylpyrrolidone onto Polydimethylsiloxane," *J. of Polymer Science: Part A*, vol. 2, pp. 5093-5098, (1964).

Yasuda et al., "Ultrathin Coating by Plasma Polymerization Applied to Corneal Contact Lens," *J. Biomed. Mater Res.*, vol. 9, 1975, pp. 629-643.

"Gas Phase Polymerization," *Plastics Technology*, vol. 10, Feb. 1964, pp. 9-11.

*Primary Examiner*—John K. Corbin
*Assistant Examiner*—Scott J. Sugarman
*Attorney, Agent, or Firm*—Frank C. Parker; Ronald L. Lyons

[57] ABSTRACT

The surface of a contact lens is modified by deposition of an ultrathin coating of a hydrophilic polymer under the influence of plasma glow discharge so as to integrally bond the coating to the surface of the hydrophobic lens thereby effecting a hydrophilic lens.

4 Claims, No Drawings

PROCESS FOR PUTTING A HYDROPHILIC COATING ON A HYDROPHOBIC CONTACT LENS

BACKGROUND OF THE INVENTION

1. Field of the Invention

This invention relates to transparent contact lenses for correcting vision deficiencies of the eye. More particularly this invention relates to contact lenses having a central core of a transparent hydrophobic oxygen permeable polymeric material of a uniform, ultrathin coating of a hydrophilic polymeric material integrally bonded to the surface of the hydrophobic material.

2. Description of the Prior Art

Presently, contact lenses can be prepared from optically clear hydrophilic gel materials such as disclosed in U.S. Pat. No. 2,976,576 issued Mar. 28, 1961 of O. Wichterle et al. or from hydrophobic materials such as polymethylmethacrylate.

While the hydrogel lenses of Wichterle et al. are optically satisfactory, have excellent wettability characteristics, and are comfortable on the eye, they are sufficiently oxygen permeable to the extent a patient can suitably wear the lens for a period of time of about 12 hours. The hard contact lenses such as those prepared from polymethylmethacrylate are without any manifestation of oxygen permeability and can be uncomfortable to the wearer because of the lack of wettability and the lack of flexibility. The hardness of the lens causes it to be particularly incompatible with the eye surface.

Soft lenses such as those prepared from polysilicones manifest excellent oxygen permeability. However, the silicone lenses are not wettable and hence, subject the wearer to discomfort.

In order to obtain contact lenses having the characteristics of softness and high oxygen permeability together with wettability it has been suggested that the surface of a silicone core be rendered hydrophilic by treating the surface with a hydrophilic material. U.S. Pat. No. 3,745,042 of Lim et al., issued July 10, 1973, discloses a method of hydrophilizing hydrophobic lenses by coating a hydrophobic lens with a hydrophilic polymerizable hydrophilic monomer, swelling the surface of the lens material in a suitable swelling solvent so as to allow a partial soaking of the hydrophilic material into the hydrophobic material and polymerizing.

U.S. Pat. No. 3,916,033 of Merrill, issued Oct. 28, 1975, discloses a method of grafting a hydrophilic polymer onto the surface of a polysiloxane lens by means of high energy ionizing radiation.

U.S. Pat. No. 3,854,982 of Aelion et al., issued Dec. 17, 1974, discloses a method of hydrophilizing the surface of a hydrophobic substrate by coating the hydrophobic surface with a polymerizable hydrophilic material and irradiating the coated substrate with high energy radiation.

Other patents which disclose methods of hydrophilizing hydrophobic substrates are West German Pat. No. 3,165,805 and U.S. Pat. No 3,350,216 of McVannel et al., issued Oct. 31, 1967, and U.S. Pat. No. 3,854,982 of Aelion, issued Dec. 17, 1974. In each of these methods the control of the hydrophilic thickness is difficult and the hydrophilic surface may not be uniform.

SUMMARY OF THE INVENTION

According to the present invention there is provided an optically clear contact lens comprising an oxygen permeable core of a hydrophobic polymer the surface having coated thereon and integrally bonded thereto a hydrophilic polymer, said coating being uniformly thick and in the range of from about 50 Angstroms to about 20,000 Angstroms. Polymerization is achieved by subjecting the monomer, in gaseous state, to the influence of electromagnetic energy, such as for example radio frequency or microwave energy, of a frequency and power sufficient to cause an electrodeless glow discharge of the monomer vapor. The polymer species deposits onto the hydrophobic surface of the contact lens shaped material. The deposition of the growing species results in a highly crosslinked coating bonded to the hydrophobic surface. In accordance with another feature of this invention, the contact lens provided with an ultrathin and uniform hydrophilic coating is obtained by placing a hydrophobic polymer in the shape of a contact lens in a chamber, introducing a quantity of monomer polymerizable to a hydrophilic polymer into the chamber, reducing the pressure and subjecting the monomer to electrodeless glow discharge polymerization. The monomer thereby forms an ultrathin, uniform coating integrally bonded to the hydrophobic core. The lens of this invention as related to the eye is wettable, highly oxygen permeable and soft and has an essentially flawless surface.

Lens surfaces as provided in accordance with this invention have an ultrathin hydrophilic coating which is uniformly thin and absent any noticeable pits and cracks which would disadvantageously affect the comfort of the eye of the patient. The hydrophilic coating of this invention can be bonded to a soft hydrophobic core material such as polyorganosiloxanes or to a hard hydrophobic material.

DESCRIPTION OF THE PREFERRED EMBODIMENTS

As hereinabove referred to, it has been surprisingly discovered that highly oxygen permeable hydrophobic contact lenses can be hydrophilized by coating and integrally bonding a hydrophilic polymer to the surface of the lens without substantially reducing the oxygen permeability of the lens. This accomplishment is obtained even though the hydrophilic polymer itself evidences significantly reduced oxygen permeability as compared to the hydrophobic lens material. The absence of any reduction of oxygen peremability for the coated lens is achieved because of the ultrathin coating which can be in the range of from about 50 Angstroms to about 20,000 Angstroms, desirably from about 100 Angstroms to about 1000 Angstroms and preferably from about 100 Angstroms to about 200 Angstroms. Because the coating is ultrathin and as a result of the method of preparing the hydrophilized contact lens, the coating is uniformly thin about the surface of the lens and is essentially flawless.

Illustrative of the monomers which can be suitably employed and which are polymerizable to hydrophilic polymers are the hydroxyalkylmethacrylates and acrylates, such as 2-hydroxyethylmethacrylate, 2-hydroxypropylmethacrylate, and the corresponding acrylates; the olefin glycol methacrylates and the corresponding acrylates such as diethylene glycol monomethacrylate, triethylene glycol monomethacrylate, tetraethylene glycol monomethacrylate, propylene glycol monomethacrylate and deca(ethylene glycol) methacrylate; the methoxyolefin glycol methacrylates and the corresponding acrylates such as methoxydiethylene glycol methacrylate, methoxytriethylene glycol methacrylate, methoxytetraethylene glycol methacrylate, methoxypropylene glycol methacrylate and methoxydeca(ethyleneoxide) methacrylate; alkylaminoalkylmethacrylates such as 2-dimethylaminoethyl methacrylate and morpholinoethyl methacrylate, piperidimoethylmethacrylate, 2-butylaminoethylmethacrylate. Other monomers which will polymerize by plasma glow discharge and form a hydrophilic coating on the surface of the hydrophobic oxygen permeable core lens can be employed such as glycidylmethacrylate, propylene oxide and N-vinyl-2-pyrrolidone.

Compounds which generally do not polymerize employing convention polymerizing techniques but will polymerize under plasma coating techniques and can be usefully employed in accordance with this invention are alcohols such as methanol, ethanol, propanol, butanol, pentanol and the like; aldehydes, such as methanol, ethanal, propanal, butanal and the like; ketones such as propanone, butanone, 2-pentanone, 3-pentanone, 3-methyl-2-butanone, and the like; ethers such as ethyl ether, methyl ether, methylethylether, and the like; acrylamides and methacrylamides such as acrylamide, methacrylamide, 2-hydroxyethylmethacrylamide and 2-hydroxyethylacrylamide, acrylic and methacrylic carbonylic acids such as acrylic acid, methacrylic acid, crotonic acid, 3-butenoic acid and the like.

The monomers can be employed individually to form homopolymers or in any combination so as to prepare copolymers in forming the hydrophilic coating and can be polymerized with or without the presence of cross-linking agents. Among the cross-linking agents that can be employed are the olefin glycol dimethacrylates such as ethylene glycol dimethacrylate, diethylene glycol dimethacrylate, triethylene glycol dimethacrylate, tetraethylene glycol dimethacrylate, 1,4-butylene glycol dimethacrylate, 1,3-butylene glycol dimethacrylate. Other cross-linking agents which may be suitably employed are 1,1,1-trimethylol propane trimethacrylate and methacrylyl glycolic acid.

The hydrophobic core material can be prepared from either hard or soft polymer compositions so long as the material is oxygen permeable and optically clear.

Polymeric materials which can be usefully employed are the silicone polymers. Any silicone polymer, copolymer or interpolymer can be employed so long as it is optically transparent and is oxygen permeable. Illustrative polysilicones are polydimethyl siloxane, polydimethyl-co-vinylmethylsiloxane. Other silicones are the silicone rubbers described in U.S. Pat. No. 3,228,741 of Becker issued Jan. 11, 1966; blends such as those described in U.S. Pat. No. 3,341,490 of Burdick et al., issued Sept. 12, 1967 and silicone compositions such as described in U.S. Pat. No. 3,518,324 of Polmanteer, issued June 30, 1970.

Particularly desirable silicone compositions useful in forming the core of the lens of this invention are the cross-linked polysiloxanes obtained by cross-linking siloxane prepolymers by means of hydrosilylation, co-condensation and by free radical mechanisms.

Particularly suitable are the organosiloxane polymer mixtures which readily undergo hydrosilylation. Such prepolymers will comprise vinyl radicals and hydride radicals which serve as cross-linking sites during the chain extension and cross-linking reaction and are of the general formulation comprising polydihydrocarbyl-co-vinylhydrocarbylsiloxane and polydihydrocarbyl-co-hydrocarbylhydrogensiloxanes wherein the hydrocarbyl radicals are monovalent hydrocarbon radicals such as alkyl radicals having 1–7 carbon atoms such as methyl, ethyl, propyl, butyl, pentyl, hexyl and heptyl; aryl radicals, such as phenyl, tolyl, xylyl, biphenyl; haloaryl, such as, chlorophenyl and cycloalkyl radicals, such as cyclopentyl, cyclohexyl, etc. Preferably the composition comprises polydialkyl-co-alkylphenyl-co-alkyl-vinylsiloxane and polydialkyl-co-hydrogenalkylsiloxane with at least 50 mole % of the hydrocarbyl being methyl.

In a preferred embodiment of this invention the mixture for hydrosilylation can comprise 100 parts of $\alpha,\omega$-bisdimethylvinylsiloxy-poly(dimethylsiloxane) having a degree of polymerization ($\overline{DP}$) of about 650, 20 parts of $\alpha,\omega$-bisdimethylvinylsiloxy-poly(dimethylsiloxane-co-methylvinylsiloxane) having a $\overline{DP}$ of about 20, wherein the ratio of dimethylsiloxane to methylvinylsiloxane is about 95 to 5 on a molar basis, and 9.3 parts of $\alpha,\omega$-bis-dimethylhydrogensiloxy-poly(dimethylsiloxane-co-methylhydrogensiloxane) having a $\overline{DP}$ of about 15 and wherein the dimethylsiloxane to methylhydrogensiloxane is present in a ratio of about 70 to 30 on a molar basis; the mixture having a viscosity of about 47.5 Stokes at 25° C. Another preferred hydrosilylation composition comprises 100 parts of $\alpha,\omega$-bisdimethylvinylsiloxy-poly(dimethylsiloxane) having a $\overline{DP}$ of about 650, 13.3 parts of $\alpha,\omega$-bisdimethylvinylsiloxy-poly(dimethylsiloxane-co-methylvinylsiloxane) having a $\overline{DP}$ of about 650 and wherein the dimethylsiloxane to methylvinylsiloxane is present in a ratio of about 97.5 to 2.5 on a molar basis, and 8.3 parts of bistrimethylsiloxy-poly(dimethylsiloxane-co-methylhydrogensiloxane) having a $\overline{DP}$ of about 250 and wherein the ratio of dimethylsiloxane to methylhydrogensiloxane is about 90 to 10 on a molar basis; the mixture having a viscosity of about 104.3 Stokes at 25° C. Still another preferred hydrosilylation composition comprises 100 parts of $\alpha,\omega$-bisdimethylvinylsiloxy-poly(dimethylsiloxane) having a $\overline{DP}$ of about 650, 19.6 parts of $\alpha,\omega$-bistrimethylsiloxy-poly(dimethylsiloxane-co-methylvinylsiloxane) having a $\overline{DP}$ of about 250 and wherein the dimethylsiloxane to methylvinylsiloxane ratio is about 90 to 10 on a molar basis, and 7.8 parts of $\alpha,\omega$-bisdimethylhydrogensiloxy-poly(dimethylsiloxane-co-methylhydrogensiloxane) having a $\overline{DP}$ of about 15 and wherein the dimethylsiloxane to methylhydrogensiloxane ratio is about 70 to 30 on a molar basis; the mixture having a viscosity of about 47.5 Stokes at 25° C.

Another particularly suitable organosiloxane mixture which can be suitably employed to provide the hydrophobic portion of this invention are the prepolymers of poly(organosiloxanes) which readily undergo condensation reactions to form a cross-linked poly(organosiloxane).

The prepolymer(organosiloxane) mixtures comprise a mixture of poly(organosiloxanes) containing terminal silicone-bonded hydroxy groups, said polymer mixtures having a viscosity of about 1 Stoke at 10,000 Stokes to 25° C., and an organosiloxane cross-linking agent containing alkoxy groups. The hydroxy terminated siloxanes have the general formula:

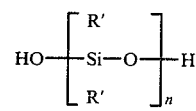

wherein each R' can be the same or different and is selected from one of alkyl radicals having 1-7 carbon atoms such as methyl, ethyl, propyl, butyl, pentyl, hexyl and heptyl; aryl radicals such as phenyl, tolyl, xylyl, ethylphenyl, benzyl and the like; haloaryl such as chlorophenyl and the like. Preferably at least 50 percent of the R' radicals will be methyl radicals and n is an integer selected so as to obtain a viscosity of from about 1 Stoke to about 10,000 Stokes at 25° C.

The cross-linking agent portion of the mixture can be one or more of (a) monomeric organosilicates having the general formula $R_m Si(OR'')_{4-m}$, (b) partial hydrolyzates of (a), (c) poly(organosiloxanes) having the general formula $R_m(R''O)_{3-m}SiO(R_2SiO)_n Si(OR'')_{3-m}R_m$ and (d) poly(organosiloxane resins comprising $R_3SiO_{1/2}$ and $SiO_2$ units in a ratio of about 0.3:1 to 1:1 wherein R'' can be alkyl radicals having 1-7 carbon atoms such as methyl, ethyl, propyl, butyl, pentyl, hexyl and heptyl, R can be R'' and phenyl, M is an integer of 0 or 1 and n is such that (c) has a viscosity of 0.1 Stokes to about 1,000 Stokes at 25° C.

The individual ingredients of the condensation composition can have a wide variety of viscosities. Preferably, however, the total composition can have a viscosity of from about 1 Stoke to about 10,000 Stokes at 25° C. and preferably about 10 Stokes to about 4,000 Stokes at 25° C.

In a preferred embodiment of this aspect of the invention the polysiloxane condensation composition comprises about 0.5 gm of $\alpha,\omega$-bisdimethylhydroxysiloxypoly(dimethylsiloxane) having a viscosity of about 50 Stokes at 25° C., about 38 microliters of ethylsilicate prepolymer having a molecular weight of about 600 to 620 and 7 microliters of dibutyltin dilaurate.

Another mechanism by which poly(organosiloxanes) are known to cross-link is by free radical cross-linking. The poly(organosiloxanes) which can be readily employed are the poly(organosiloxanes) containing vinyl unsaturation described above. Typically, benzophenone can be selectively employed for the free radical cross-linking of the poly(organosiloxanes).

Other suitable silicone polymer compositions such as block polymers of polysilicones with polycarbonates and polysilicones with polystyrene can be readily employed.

The polysilicones can be free of filler or can contain a filler having substantially the same index of refraction as the silicones such as, for example, silica.

Other core materials which can suitably be employed are cellulose acetate butyrate disclosed in U.S. Pat. No. 3,900,250 of Ivani issued Aug. 19, 1975, the copolymers of polysiloxanylalkyl esters disclosed in U.S. Pat. No. 3,808,178 of Gaylord, issued Apr. 30, 1974 and the perfluoroalkyl alkyl methacrylates having a refractive index of about 1.36 to about 1.45 disclosed in U.S. Pat. No. 3,950,315 of Cleaver issued Apr. 13, 1976.

In the process of preparing the lens of this invention, the core is shaped in the form of a contact lens of desired dimensions by any of the methods well known in the art such as placing the material to form the core in a mold cavity contoured in the form of a lens, the core material being polymerized therein. The core material can be prepared by polymerizing and shaping the polymerized product into a rod and by means of cutting and lathing forming a lens shaped core. The core materials can be shaped by spin casting the core forming materials. Each of these methods of forming contact lenses are well known in the art and hence need not be elaborated upon.

The hydrophobic core in the shape of a contact lens is then placed into the reaction chamber of an electrodeless plasma excitor such as Plasma Excitor model 320 manufactured by Technics, Inc., Alexandria, Va. The monomer or monomers with or without cross-linking agents is placed in a reservoir having an inlet means into the polymerization chamber. The reaction chamber is evacuated to a pressure of about 50 to about 1,000 millitorr and preferably 200 millitorr. The reaction chamber containing hydrophobic lenses and monomer in vapor form is subjected to electromagnetic radiation thereby initiating a glow discharge which initiates ionization of the vaporized monomer and polymerization of the ionized material onto and integrally to the surface of the hydrophobic lens. Throughout the evacuation and glow discharge the inlet means from the reservoir is maintained in an open position in order to maintain a constant partial pressure of the monomer in the reaction chamber as monomer is depleted. The frequency of the electromagnetic radiation employed can vary over a wide range and is determined primarily by the instrument employed. The frequency desirably employed is about 15.6 megahertz. The reaction time under which the substrate is exposed to the glow discharge of the monomer as well as the polymerization rate and monomer vapor pressure in the chamber will determine the thickness of the coating, the thickness being nearly linear to the rate, time and monomer vapor pressure. Generally exposures of from about 0.2 minutes to 10 minutes will be sufficient to obtain the ultrathin hydrophilic coatings of this invention. Longer exposures can result in undesirable mechanical properties. It has been surprisingly discovered that the ultrathin coating, which can be in the range of 50 Angstroms to about 20,000 Angstroms, desirably 100 Angstroms to about 100 Angstroms and preferably 100 Angstroms to about 200 Angstroms, does not reduce the oxygen permeability of the hydrophobic material in noticeable amounts.

The wettability of hydrophilized lenses was determined by measuring the contact angle of a water drop on the lens. The contact angle measurements were determined by the sessile drop (air-$H_2O$) technique whereby a sessile liquid drop on the surface is defined by the interior angle made by a line tangent to the curve of the image of the drop at the surface of the solid and a line defining the base of the drop.

As mentioned above it has been discovered that the oxygen transport rate and permeability of the core material is not appreciably affected by a coating of a less oxygen permeable material. The oxygen transport rate of a polysiloxane lens, for example, the polysiloxane being sold under the tradename Sylgard 184 (Dow Corning) at one atmosphere is about $8.1 \times 10^{-6}$ $cm^3/cm^2 sec.$ for a sample of 0.16 mm thick. After being coated with 2-hydroxyethyl-methacrylate in accordance with this invention the oxygen transport rate was measured at $7.5 \times 10^{-6} cm^3/cm^2 sec.$ The coating virtually did not change the $O_2$ transport rate.

The following examples illustrate the invention.

EXAMPLE I

A lens, made from cross-linked polydialkylsiloxane, namely Dow Corning's Sylgard 184, which is a mixture of predominantly polydimethylsiloxanes having hydrogen and vinyl cross-linking sites, was placed in a chamber of a plasma excitor, model Plasma Excitor 320 by Technics, Inc., Alexandria, Va. Eight microliters of N-vinyl-2-pyrrolidone was placed into the chamber and the chamber pressure was reduced to 200 millitorr ± 10 millitorr. The chamber was then subjected to electromagnetic radiation of 15.6 megahertz for one minute. The lens is uniformly coated with an ultrathin coating of poly-N-vinyl-2-pyrrolidone which is integrally bonded to the core.

Four additional polydiorganosiloxanes lenses are each subjected to the treatment as described above with exception that the amount of N-vinyl-2-pyrrolidone is varied.

The wettability of the lens was determined at room temperature by contact angle goniometry. The contact angles were measured on a NRL Contact Angle Goniometer (Model A-100 Rome-Hart, Inc., Mountain Lakes, N.J.) by measuring the advancing contact angle employing the sessile droplet technique as described in Wettability of Hydrogels by Frank V. Holly and Miguel F. Refojo (J. Biomed. Mater. Res. 9, 315-326, 1975). The lenses were further tested for optical transparency and oxygen permeability.

The oxygen permeability and transport rate remains virtually unchanged as compared with the lens without the coating. The lenses were wettable and the coatings uniformly thin.

The results are summarized in Table I.

TABLE I

| Amount of N-vp | Contact Angle Before Coating | Contact Angle After Coating | Optical Transparency |
|---|---|---|---|
| 8 μl | 98° | 43° | transparent |
| 16 μl | 90° | 49° | transparent |
| 24 μl | 94° | 47° | transparent |
| 32 μl | 95° | 45° | translucent |
| 40 μl | 95° | 43° | translucent |

EXAMPLE II

Three lenses prepared from the material described in Example I are each exposed to electromagnetic radiation of a frequency of 15.6 megahertz in the presence of 16 of N-vinyl pyrrolidone under a pressure of 200 millitorr ± 10 millitorr. Each lens is subjected to the radiation for an increasing period of time. The lenses having a uniform, ultrathin coating were tested for wettability, oxygen permeability and optical transparency. The contact angles are determined as described in Example I. The oxygen permeability and transport rate remains virtually unchanged as compared with the lens not coated. The results are summarized in Table II.

TABLE II

| Time of Grafting (min) | Contact Angle Before Coating | Contact Angle After Coating | Optical Transparency |
|---|---|---|---|
| 1 | 103° | 49° | transparent |
| 2 | 102° | 41° | translucent |
| 3 | 103° | 40° | translucent |

EXAMPLE III

A contact lens was prepared from a substrate of cross-linked polydialkylsiloxane, namely Dow Corning's Slygard 184 and an ultrathin coating of poly-2-hydroxyethylmethacrylate. The ultrathin coating was obtained by the method described in Example I.

The contact angle of the substrate was 110°. The contact angle obtained after the coating was 65°.

I claim:

1. An electrodeless glow discharge polymerization and coating process for making a hydrophobic contact lens into a hydrophilic contact lens consisting essentially of:
    (1) providing a hydrophobic, optically transparent, oxygen permeable contact lens,
    (2) placing the hydrophobic contact lens into a glow discharge apparatus containing an atmosphere comprising a polymerizable organic monomer consisting essentially of hydroxyalkylmethacrylates, hydroxyalkylacrylates, glycidylmethacrylate, propylene oxide and N-vinyl-2-pyrrolidone; and
    (3) subjecting the monomer to electromagnetic radiation sufficient to produce an electrodeless glow discharge at a pressure of about 100 to about 700 millitorr to cause the polymerizable organic monomer to polymerize and to form hydrohilic polymeric integrally bonded uniform coating from about 50Å to about 20,000Å thick on the hydrophobic contact lens thereby forming a hydrophilic, optically transparent, oxygen permeable contact lens.

2. The process of claim 1 wherein the electromagnetic energy has a frequency of about 15.6 megahertz.

3. The process of claim 1 wherein the atmosphere is at a pressure of from about 100 millitorr to about 500 millitorr.

4. The process of claim 1 wherein the hydrophobic contact lens is a polysiloxane polymeric material and the polymerized surface coating is selected from the group consisting of poly(2-hydroxyethylmethacrylate) and poly(N-vinyl-pyrrolidone).

* * * * *